(12) United States Patent
Moreno et al.

(10) Patent No.: US 12,366,604 B2
(45) Date of Patent: Jul. 22, 2025

(54) METHOD AND APPARATUS FOR DETECTION OF COUNTERFEIT PARTS, COMPROMISED OR TAMPERED COMPONENTS OR DEVICES, TAMPERED SYSTEMS SUCH AS LOCAL COMMUNICATION NETWORKS, AND FOR SECURE IDENTIFICATION OF COMPONENTS

(71) Applicant: PALITRONICA INC., Waterloo (CA)

(72) Inventors: Carlos Moreno, Waterloo (CA); Sebastian Fischmeister, Waterloo (CA); Philippe Vibien, Waterloo (CA)

(73) Assignee: Palitronica Inc., Waterloo (CA)

( * ) Notice: Subject to any disclaimer, the term of this patent is extended or adjusted under 35 U.S.C. 154(b) by 213 days.

(21) Appl. No.: 17/762,996

(22) PCT Filed: Sep. 23, 2020

(86) PCT No.: PCT/CA2020/051266
§ 371 (c)(1),
(2) Date: Mar. 23, 2022

(87) PCT Pub. No.: WO2021/056101
PCT Pub. Date: Apr. 1, 2021

(65) Prior Publication Data
US 2022/0341990 A1 Oct. 27, 2022

Related U.S. Application Data

(60) Provisional application No. 62/953,456, filed on Dec. 24, 2019, provisional application No. 62/903,935, filed on Sep. 23, 2019.

(51) Int. Cl.
*G06F 21/00* (2013.01)
*G01R 31/302* (2006.01)
(Continued)

(52) U.S. Cl.
CPC ... *G01R 31/31719* (2013.01); *G01R 31/3025* (2013.01); *G01R 31/31713* (2013.01); *G01R 31/31907* (2013.01)

(58) Field of Classification Search
None
See application file for complete search history.

(56) References Cited

U.S. PATENT DOCUMENTS 5,218,294 A * 6/1993 Soiferman ........... G01R 31/315
324/95
5,751,149 A * 5/1998 Oberg .................... G01R 27/06
324/533

(Continued)

FOREIGN PATENT DOCUMENTS

EP 3490054 A1 * 5/2019 ............. G08B 21/18

OTHER PUBLICATIONS

International Search Report Dated Dec. 11, 2020 For Corresponding International PCT Patent Application No. PCT/CA2020/051266; 4 Pages.

(Continued)

*Primary Examiner* — Maung T Lwin (57) ABSTRACT

Methods, systems and techniques are provided to authenticate a device under test (DUT)/system under test (SUT) comprising an electronic component(s). A profile is defined by injecting a signal to elicit an output that is responsive a physical characteristic of the type of DUT/SUT. In respective embodiments the injected signal is defined to elicit an output for time-domain or frequency-domain evaluation. An injected signal may comprise combinations of (non-destructive/non-activating) signals applied to multiple access points for measurement at arbitrary access points of the DUT/SUT. In an embodiment, measurements of multiple DUT/SUTs of a same type are used to define a common profile. In an embodiment, the profile is built using machine learning to (Continued)

define a classifier. In other embodiments, statistical profiles are defined. During use, output is generated for a target DUT/SUT for evaluation relative to the profile. Counterfeit/alternate designs, altered designs, and implants are detectable.

29 Claims, 5 Drawing Sheets

(51) Int. Cl.
G01R 31/317 (2006.01)
G01R 31/319 (2006.01)

(56) References Cited

U.S. PATENT DOCUMENTS

| | | | | |
|---|---|---|---|---|
| 6,101,622 | A * | 8/2000 | Lesmeister | G01R 31/31922 714/724 |
| 7,148,676 | B2 * | 12/2006 | Kamano | G01R 31/31907 324/756.02 |
| 7,151,367 | B2 * | 12/2006 | Belleau | G01R 29/02 324/750.01 |
| 8,022,687 | B2 * | 9/2011 | Ortler | G01R 35/005 324/76.23 |
| 8,154,308 | B2 * | 4/2012 | Kormanyos | G01R 31/31712 324/750.18 |
| 8,242,793 | B2 * | 8/2012 | Kumhyr | G01R 33/10 324/750.3 |
| 9,642,014 | B2 * | 5/2017 | Keller | G06F 21/56 |
| 10,395,032 | B2 * | 8/2019 | Keller | G06F 21/566 |
| 10,908,980 | B2 * | 2/2021 | Derat | H04B 5/73 |
| 2004/0073395 | A1 * | 4/2004 | Furse | G01R 31/11 702/108 |
| 2005/0182588 | A1 * | 8/2005 | Chenoweth | G01R 31/31907 702/118 |
| 2009/0105971 | A1 * | 4/2009 | Chen | G06F 11/24 702/59 |
| 2012/0033810 | A1 | 2/2012 | Devadas et al. | |
| 2012/0226463 | A1 | 9/2012 | Keller, III et al. | |
| 2013/0127442 | A1 | 5/2013 | Satoh et al. | |
| 2015/0219714 | A1 * | 8/2015 | Hamilton | G06F 21/73 702/65 |
| 2016/0098561 | A1 * | 4/2016 | Keller | G06F 21/566 726/24 |
| 2016/0227421 | A1 * | 8/2016 | Smith | H04W 24/06 |
| 2017/0160320 | A1 | 6/2017 | Aguayo Gonzalez et al. | |
| 2018/0204002 | A1 | 7/2018 | Khorrami et al. | |
| 2018/0348278 | A1 | 12/2018 | House et al. | |
| 2019/0122227 | A1 | 4/2019 | Spory | |
| 2019/0391202 | A1 * | 12/2019 | Chang | G01R 31/2813 |
| 2020/0058364 | A1 * | 2/2020 | Troy | G01R 31/31813 |

OTHER PUBLICATIONS

Written Opinion Dated Dec. 11, 2020 For Corresponding International PCT Patent Application No. PCT/CA2020/051266; 6 Pages.
Extended European Search Report Dated Sep. 15, 2023, 15 Pages for Corresponding European Patent Application No. 20870043.5.

* cited by examiner

METHOD AND APPARATUS FOR DETECTION OF COUNTERFEIT PARTS, COMPROMISED OR TAMPERED COMPONENTS OR DEVICES, TAMPERED SYSTEMS SUCH AS LOCAL COMMUNICATION NETWORKS, AND FOR SECURE IDENTIFICATION OF COMPONENTS

CROSS-REFERENCE

The present application claims 1) in respect of the United States, the domestic benefit of; and 2) in respect of all other territories, priority to: U.S. Provisional Application No. 62/903,935 filed Sep. 23, 2019 and U.S. Provisional Application No. 62/953,456 filed Dec. 24, 2019, the contents of each of which provisional application is incorporated herein in its respective entirety, where permissible.

FIELD

This application relates to quality assurance and testing methods, devices and techniques and more particularly to a method and apparatus for detection of counterfeit parts, compromised or tampered components or devices, tampered systems such as local communication networks, and for secure identification of components.

BACKGROUND

Modern cyber-physical and, in general, electronic and computing systems rely on many small and increasingly sophisticated electronic parts. Authenticity of these electronic parts becomes a critical aspect when considering correctness, reliability and in general dependability of the systems that use these parts. Similarly, security and privacy issues are affected if the authenticity of these parts is not enforced.

Sophisticated supply-chain attacks can inject inauthentic parts into manufacturing and rebuild/refurbishment operations. The threat of counterfeit parts, maliciously tampered electronic parts, and Trojanized electronic parts or devices have become a critical aspect in areas such as automotive, aerospace, industrial control systems, and defence applications. Techniques to detect inauthentic parts are usually intrusive, destructive, and often expensive.

SUMMARY

Methods, systems (apparatus) and techniques are provided to authenticate a device under test (DUT)/system under test (SUT) comprising an electronic component(s). A profile is defined by injecting a signal to elicit an output that is responsive a physical characteristic of the type of DUT/SUT. In respective embodiments the injected signal is defined to elicit an output for time-domain or frequency-domain evaluation. An injected signal may comprise combinations of (non-destructive/non-activating) signals applied to multiple access points for measurement at arbitrary access points of the DUT/SUT. In an embodiment, measurements of multiple DUT/SUTs of a same type are used to define a common profile. In an embodiment, the profile is built using machine learning to define a classifier. In other embodiments, statistical profiles are defined for use when evaluating. During use, output is generated for a target DUT/SUT for evaluation relative to the profile. Counterfeit/alternate designs, altered designs, and implants are detectable.

In an embodiment, there is provided a method comprising: generating and applying an injected signal to a device under test (DUT)/system under test (SUT) to elicit an output generated in response to an injected signal, the DUT/SUT comprising an electronic component to be authenticated; capturing the output; and providing the output for evaluating relative to a profile defined for a type of the DUT/SUT, to determine an authentication result for the DUT/SUT.

In an embodiment, there is provided a method comprising: receiving an output generated by a device under test (DUT)/system under test (SUT), the output generated in response to an injected signal applied to the DUT/SUT and to the DUT/SUT comprising an electronic component to be authenticated; evaluating the output, relative to a profile defined for a type of the DUT/SUT, to determine an authentication result for the DUT/SUT; and providing the authentication result for at least one of display and subsequent action relative to the DUT/SUT.

The output may be responsive to physical characteristics of the DUT/SUT, which influence one or more of: a speed at which electrical signals comprising an electromagnetic wave travel through a medium; a reflection pattern; and a transmission pattern.

The profile may comprises a statistical profile or a classifier to classifier the output.

Evaluating may include a time-domain evaluation. The injected signal may comprise a pulse signal.

Evaluating may include a frequency-domain evaluation. The injected signal may comprise a frequency sweep or a plurality of signals at discrete frequencies.

Evaluating may include a power spectral characteristic evaluation. The injected signal may comprise a frequency sweep or a plurality of signals at discrete frequencies at different power levels. The injected signal may comprise a white noise or random signal with power spectral characteristics.

Receiving may comprise receiving a transmission of the output generated at a remotely located test location. The may be provided as a cloud-based service.

The DUT/SUT may comprises an integrated circuit (IC) comprising a plurality of pins and wherein the output comprises a single response to an injected signal comprising a simultaneous step signal applied to a group of two or more of the pins.

The DUT/SUT may comprise an integrated circuit (IC) comprising a plurality of pins and wherein the output comprises a collection of individual responses to an injected signal comprising individual step signals applied to two or more of the pins individually.

The DUT/SUT may comprise multiple access points and wherein the output comprises output generated at an arbitrary subset of the multiple access points, independently of a subset of the multiple access points at which the injected signal is injected. The injected signal may comprises one of: multiple copies of a same signal applied to the subset of the multiple access points at which the injected signal is injected; and different signals applied to the subset of the multiple access points at which the injected signal is injected.

When the injected signal comprises different signals, some of which may be configured to generate output for time-domain evaluation and some of which may be configured to generate output for frequency-domain evaluation.

The DUT/SUT may comprise any of: a vehicle network having a CAN bus; a PCB; a collection of interconnected electronic devices.

The electronic component may comprises an electronic control unit (ECU) coupled to the CAN bus.

The method may be repeated for the same DUT/SUT in an on-going manner. The method may be repeated periodically. The method may be initiated in association with a start-up sequence for the DUT/SUT.

The injected signal may be configured to avoid damage or activation of at least some of functionality of the DUT/SUT.

The injected signal may be injected while the DUT/SUT is in operation.

In an embodiment, there is provided a method comprising: generating and applying an injected signal to a device under test (DUT)/system under test (SUT) to elicit an output generated in response to an injected signal, the DUT/SUT comprising an electronic component to be authenticated; capturing the output; using the output to define a profile for a type of the DUT/SUT for use when evaluating subsequent instances of the DUT/SUT of the type to determine an authentication result for the subsequent instances of the DUT/SUT; and providing the profile for use when evaluating. The step of using may comprise defining a classifier to classify the output. The method may be repeated with multiple instances of the DUT/SUT to collect response data to define the profile. In the method when repeated, at least some of the instances are authentic and at least some of the instances are inauthentic.

In an embodiment there is provided an apparatus configured to perform any of the methods.

The apparatus may comprise a computing device having circuitry configured to perform the evaluating. The apparatus may comprise circuitry configured to inject the injected signal. The apparatus may comprise circuitry configured to receive a response signal from the DUT/SUT to define the output. The circuitry configured to inject the injected signal and the circuitry configured to receive the response signal may be located on or with the DUT/SUT. The remainder of the apparatus may be remotely located relative to the DUT/SUT.

In an embodiment, there is provided a system comprising: circuitry defining an authentication unit to evaluate an output generated by a device under test (DUT) or system under test (SUT) having an electronic component to be authenticated, the output generated in response to an injected signal applied to the DUT/SUT, the authentication unit evaluating the output relative to a profile for the DUT/SUT to generate an authentication result.

The system may comprise circuitry defining a communication component to: receive the output; and communicate the authentication result for at least one of display and subsequent action relative to the DUT/SUT.

The system may comprise a data store storing respective profiles for different types of DUT/SUTs. The system may comprise circuitry configured to determine the profile for the authentication unit from the respective profiles. The system may be configured to receive a type of the DUT/SUT in association with the output.

The profile may define a trained classifier for the authentication unit to classify the output.

The system may be configured as a cloud-based service.

At least some of the circuitry may be provided by a computing device having a processing unit and a storage device storing instructions, which when executed by the processing unit configure the computing device.

In an embodiment there is provided a computer program product comprising a non-transient storage device storing instructions, which when executed by a processing unit, configure the processing unit to performing at least one of the preceding method claims.

These and other aspects and features will be apparent to a person of ordinary skill in the art.

DETAILED DESCRIPTION

In accordance with embodiments, described herein are methods, apparatus and techniques to detect tampering of electronic systems, or, in general, undocumented modifications to electronic systems. This includes counterfeit electronic parts, counterfeit electronic or computing devices, maliciously modified electronic devices, Trojanized electronic parts or devices, etc. It also includes systems, buses, printed circuit boards (PCBs) and other electronic assemblies. An example of a system is the Controller Area Network (CAN) bus of a modern automobile, which may have been maliciously altered in ways such as disconnecting a device or devices, adding unauthorized malicious devices, etc.

In one embodiment, a mode of operation is based on time-domain reflectometry (TDR). In one embodiment a mode of operation is based on frequency response or system identification at the analog level. Both modes of operations are based on the following principle: the physical characteristics of a medium that transmits electronic signals determine many aspects of the observed signals, since these physical characteristics influence the speed at which electrical signals (an electromagnetic wave) travel through the medium, as well as reflection and transmission patterns.

TDR techniques are known to be used in testing cable runs and consist of applying a "step" input signal—a signal with a sharp transition from 0 Volts to some given value (e.g. from 0 Volts to 1 Volt)—and measuring the actual electric signal to observe the response of the system. The actual signal will contain the applied input signal superposed to reflections of the input signal. These reflections are usually caused by discontinuities in the transmission medium characteristics, and their amplitude and time-to-arrive depend on the physical characteristics of the transmission medium, and in general of the transmission system. These patterns are then used to determine aspects such as length of a cable, location of a damaged point of a cable, etc.

In accordance with the teaching and techniques herein, a signal, such as a step signal, is applied through one input point of a device or system under test (e.g., a pin in an integrated circuit, or a terminal in a device or a local communications bus) and a response is measured. In one embodiment, the response is measured at a different point or set of points of the system. in one embodiment, for an integrated circuit, a step signal is applied at one pin and the output signal is measured at a different pin. In one embodiment, the response is measured at all the remaining pins (i.e., at all pins other than the pin at which the step signal was applied). In one embodiment, the response is measured at all pins, including the one where the step is applied.

In accordance with the teaching and techniques herein, TDR-like techniques are applied in a completely different context: heretofore TDR has been used in interconnection systems, cables, connectors, and high-frequency equipment. As further described, TDR techniques are applied to electronic systems as a collection of transmission media, where the physical characteristics of the electronic circuit, the wires, traces, conductor and semiconductor characteristics and location, all affect the "response" of the system to a step input signal. Counterfeit parts or devices will in principle have different physical characteristics, thus their response to an input signal will be different.

In accordance with the embodiments, the systems methods and techniques herein show application of an arbitrary input signal and measurement and are not limited to only a step signal. In accordance with embodiments, measurement can be done in the time-domain (e.g. using a time-domain evaluation), in terms of the waveform of the response to the input signal (including response if measured at the same point, like in TDR, or measured at a different point or set of points). Without limiting the disclosure herein, signals other than step signals comprise a ramp signal, a constant or sustained signal at a same voltage, or a signal of any other shape. In accordance with embodiments, measurement can be done in the frequency-domain (e.g. using a frequency-domain evaluation), by measuring the frequency response or characteristics of the frequency response, including measurement of characteristic impedance or other transmission and reflection coefficients as a function of frequency. To this end, in an embodiment, a counterfeit detection system injects a frequency sweep (or a plurality of discrete frequencies, whether in sequence, or a superposition of signals at those frequencies occurring simultaneously, or another arrangement) into the device or system under test, and measures the frequency-domain characteristics of the response (e.g. when seen in the analog domain). In accordance with embodiments, spectral response is measured (e.g. via power spectrum characteristic evaluation (an example of a frequency-domain evaluation)).

In accordance with embodiments, an input signal is applied to a device or system under test at a constant power level or at different (e.g. varying) power levels. In any embodiment, any of a time-domain and/or frequency-domain response is measured. In an embodiment, any of a time-domain and/or frequency-domain response is measured combined with any patterns in the amplitude and/or power of the injected signal).

In accordance with embodiments, more than one signal (e.g. more than one type) is applied and measured. In accordance with embodiments, more than one type of signal and more than one type of response (e.g. any of a time-domain, frequency-domain with or without a combination of patterns in the amplitude and/or power of the injected signal) is measured.

In accordance with embodiments, the response measured is any one or more of a reflected response and a transmission response.

Additionally, in accordance with embodiments, an analysis of the system's response may incorporate aspects such as relationship between input and output. For example, cross-correlation or cross-covariance between input(s) and output(s).

Various embodiments are shown and described herein below.

Figure 1A:
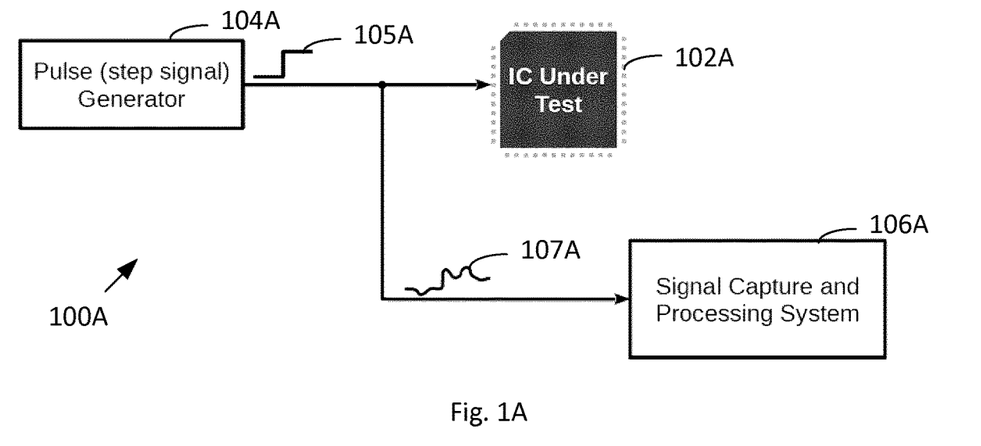
FIGS. 1A, 1B, 2A, 2B and 3 are block diagrams of respective measurement systems in accordance with embodiments.
Figure 1B:
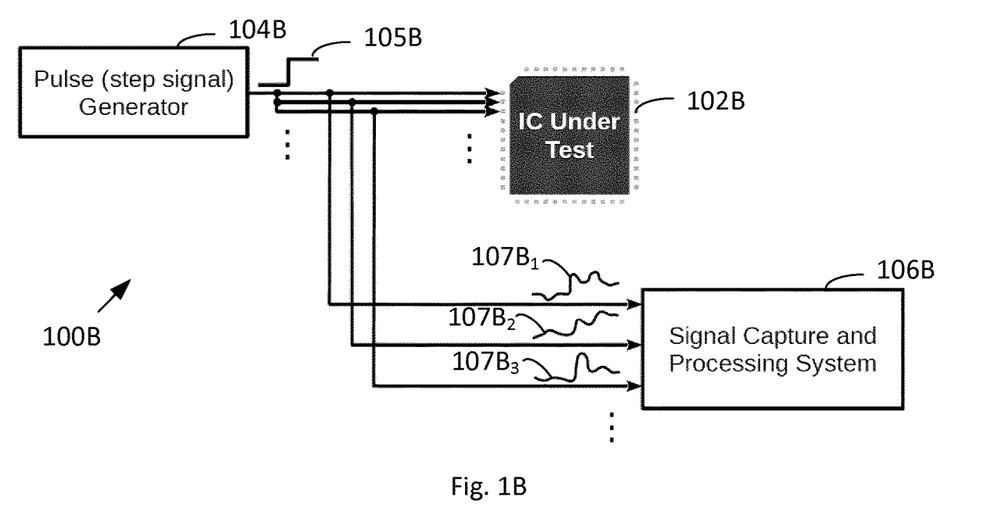

FIGS. 1A and 1B are block diagrams of respective measurement systems 100A and 100B in accordance with embodiments. In systems 100A and 100B, a respective Integrated Circuit (IC) 102A and 102B defines a respective Device under Test (DUT). For electronic parts such as ICs, each pin of the IC connects to different sections of the internal circuitry, and thus each pin will exhibit a distinct characteristic response to a step input signal. Systems 100A and 100B show a pulse generator 104A and 104B for generating step signals (e.g. 105A and 105B) and a signal capture and processing system 106A and 106B to capture and process one or more response signals (107A, 107B$_1$, 107B$_2$ and 107B$_3$). Each of the response signals in the present embodiments of FIGS. 1A and 1B are examples of reflection response signals. The embodiment of FIG. 1A shows a coupling of components 104A and 106A to one pin of IC 102A. The embodiment of FIG. 1B shows a coupling of components 104B and 106B to multiple pins of IC 102B. The embodiment of FIG. 1B thus shows simultaneous/joint step response of multiple pins of connections. That is, each pin contributes a component of a total response to the simultaneously applied signal 105B. Though labelled as a pulse (step signal) generator 104A and 104B, it is understood that in other embodiments, this signal generator component may generate a different signal.

Similarly, for electronic devices that offer an interface to other devices such as a connector with multiple terminals where prescribed signals or power supplies are connected—each of these terminals will be a transmission medium with a distinct characteristic response to a step input signal; this response will depend on factors such as internal wiring, electronic circuit(s) or part(s) to which each terminal internally connects to, etc. Tampered or counterfeit devices will likely exhibit a different response to step input signals for some or all of the terminals. FIGS. 1A and 1B illustrate the use in this context as well.

Figure 2A:
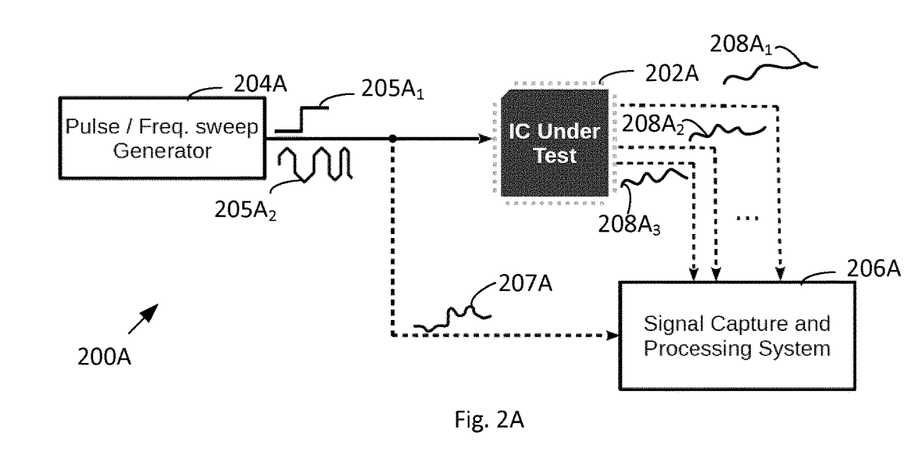
Figure 2B:
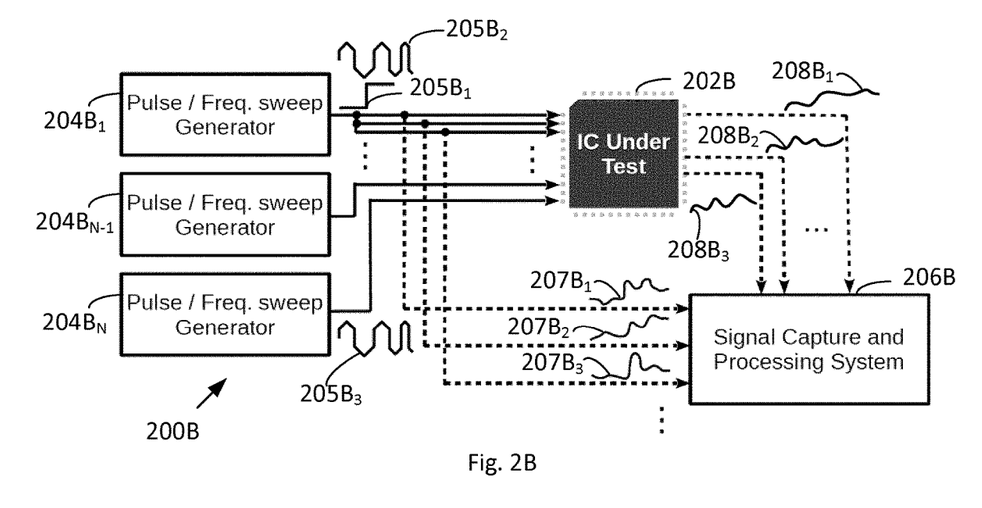

FIGS. 2A and 2B are block diagrams of respective measurement systems 200A and 200B in accordance with embodiments showing the use of time-domain or frequency-domain characteristics and the use of individual or multiple pins, measuring reflected and/or transmitted signals. FIG. 2A shows a response to input on individual pins or connections and FIG. 2B shows simultaneous/joint response on multiple pins or connections. In systems 200A and 200B, a respective Integrated Circuit (IC) 202A and 202B defines a respective DUT. Systems 200A and 200B show, respectively, one pulse/frequency sweep generator 204A and a plurality (N) of pulse/frequency sweep generators 204B$_1$, 204B$_{N-1}$ and 204B$_N$ for generating step signals and frequency sweep signals and a signal capture and processing system 206A and 206B. Though each component is labelled as a pulse/frequency sweep generator 204A, 204B$_1$, 204B$_{N-1}$ and 204B$_N$, it is understood that in other embodiments, this signal generator component may generate a different signal or signals. Pulse/frequency sweep generator 204A is configured to generate a pulse signal 205A$_1$ and a frequency sweep signal 205A$_2$. The DUT 202A generates a reflection response signal 207A and a plurality of transmission response signals (of which 208A$_1$, 208A$_2$ and 208A$_3$ are shown). Pulse/frequency sweep generator 204B$_1$ is configured to generate a pulse signal 205B$_1$ and a frequency sweep signal 205B$_2$. Each of the remaining pulse/frequency sweep generators (of which 204B$_{N-1}$ and 2054B$_N$ are shown) are configured to generate respective frequency sweep signals (of which only 205B$_3$ is shown). The DUT 202B generates reflection response signals (of which 207B$_1$, 207B$_2$ and $207B_3$ are shown) and a plurality of transmission response signals (of which $208B_1$, $208B_2$ and $208B_3$ are shown).

Figure 3:
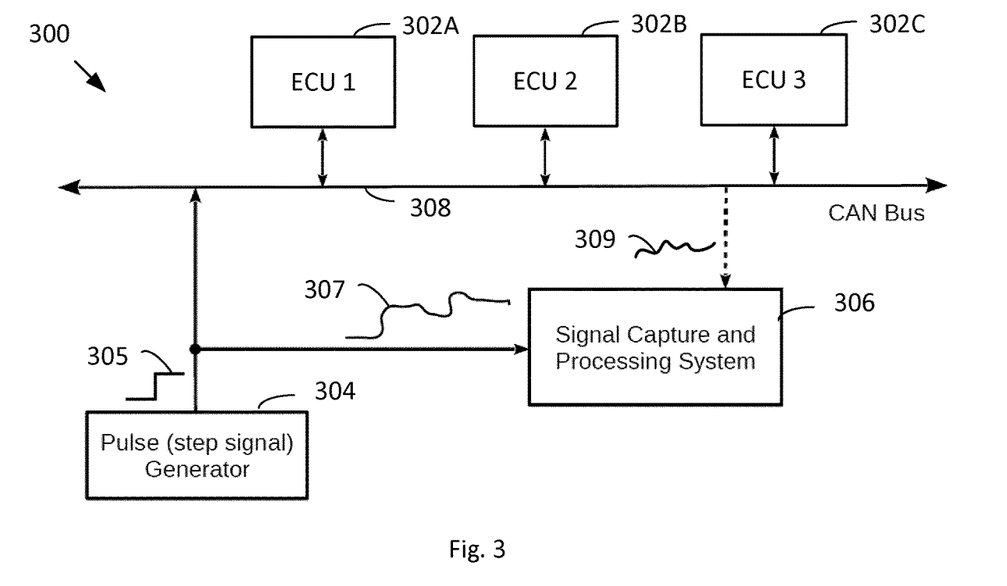

FIG. 3 is a block diagram of a measurement system 300 in accordance with an embodiment showing the use of a step response (reflected or transmitted) of a local network. In the embodiment of FIG. 3, three electronic control units ECU-1, ECU-2 and ECU-3 (respectively 302A, 302B and 302C) are coupled via a local network defined by a CAN bus 308 together defining a system under test (SUT). System 300 shows a pulse generator 304 for generating step signals (e.g. 305) and a signal capture and processing system 306 to capture a reflection response signal 307 and a transmission response signal 309 from the CAN bus including the ECUs. In an embodiment, component 304 may comprise a signal generator to generate a different type of signal. Though shown as a single component, signal capture and processing system 306 may comprise multiple components and may be remote from one another. For example, as described further with reference to FIG. 6, signal capturing functions may be local to a test location and signal processing functions may be remote to the test location with communication therebetween.

In the systems of FIGS. 1A, 1B, 2A, 2B, and 3 the respective pulse generator and pulse/frequency sweep generator and the signal capturing and processing system are shown and described generally in accordance with the respective embodiments. In an embodiment, a pulse generator is defined using circuitry such as a high slew-rate operational amplifier in a square wave generator configuration. Such components may be configured for other signal shapes. In an embodiment, a frequency sweep generator is defined using circuitry such as a voltage-controlled oscillator (VCO). In an embodiment, such a component is configurable to inject signals a discrete frequencies rather than as a sweep per se. It will be understood that signal generation components may be similarly configured to inject signals with varying power spectra. In an embodiment, signal capturing functions such as to generate capture the response to generate output for evaluation are provided by circuitry comprising an analog-to-digital converter (ADC) with sample-and-hold (S&H) capability, and processing provided by a digital signal processor (DSP) or a Field-Programmable Gate Array (FPGA) chip. In an embodiment, signal processing functions such as to evaluate the output relative to a profile are defined using the computed Dynamic Time Warping (DTW) distance evaluated on a general purpose CPU or microcontroller unit (MCU), which are examples of processing units.

In an embodiment, aspects of the measuring systems are provided by a computing device having a processing unit configurable by instructions (e.g. stored in a non-transient storage device such as a memory). The instructions are executed by the processing unit.

In systems such as a local communication network, for example the CAN bus 308 in a modern automotive system, the network itself (a twisted-pair wire in the case of CAN) is a transmission medium with characteristics that are affected by the devices connected to the network. Added devices (e.g., a malicious device inserted by an adversary) typically reduce the speed of transmission of the medium. Removal or disconnection of existing, legitimate devices will increase the speed of transmission of the CAN bus. These changes can be detected through TDR on the CAN bus wires—either observing the response of each of the wires to a step input signal, or looking at the response of the pair of wires in a differential manner (which is the way in which devices normally use the CAN bus); that is, applying a step signal between the wires and measuring the response as the differential voltage between the two wires.

The response of an IC or device at the analog level is determined by unique and unclonable characteristics from the large-scale down to random characteristics at the microscopic level resulting from random variations at the manufacturing level that makes each device or IC unique. In accordance with embodiments herein, apparatus are useful as a system to authenticate devices, using protocols similar to those used with physical unclonable functions (PUFs). Notice that the analog domain system's response may be assessed for a system in operation as well as while powered off, even if the response may be different in both cases.

In accordance with a technique herein, analog input signals are injected at a pin or pins of an IC, or terminal connections in an electronic device, or at the wires of a communication network such as the CAN bus in modern automobiles. In accordance with an embodiment, the analog signals are low-voltage to remain under voltage thresholds that activate the device's functionality or potentially cause damage. However, it will be understood that the analog signal comprises any arbitrary signals at any arbitrary voltage levels.

In the following description, the term "access point" refers to IC pins, devices' terminal connections, or wires. Independently of whether these access points are input or output points with respect to the nominal functionality of the device, they can all be treated as input points when seen from the perspective of the analog domain, particularly when using injected signals comprising low voltage signals.

In respective embodiments, the input signals include but are not limited to: a) Step signals, to measure the system's step response; and b) arbitrary waveforms, considering the following examples: i) an input signal chosen with a similar purpose as the step's response. In an example the input signal takes advantage of a particular characteristic of the input waveform that makes it more precise or more efficient to determine certain characteristics of the system under test based on the response to that particular input waveform; ii) a frequency sweep, or signal with components (sinusoidal or otherwise) that facilitates measuring frequency response or any frequency-domain characteristics of the system's response; or iii) white noise or other random signal either where the spectral characteristics are known a priori or measured (e.g. when injected) to measure frequency-domain characteristics of the system under test. In an example, spectral characteristics of input and output (e.g., power spectral densities) are compared.

In respective embodiments, an input signal is respectively injected a) at one point and measured at the same point (as in TDR); b) at one point and measured at a different point or points; c) such that a same signal or several signals are injected at several points and measured at one or several other points; or, d) in general: such that a signal or signals are injected at any arbitrary subset of access points of the system under test, and measure at any arbitrary subset of access points of the system under test.

In an embodiment, in particular for time-domain measurements, such as step response, an apparatus (e.g. a measurement system) injects a periodic square wave and measures the DUT/SUT's response (the "output") to each of the edges. If the frequency of this periodic square wave is well below the DUT/SUT's transient response, then each edge of the square wave will cause the DUT/SUT to respond with its step response. In an embodiment, the apparatus takes advantage of these multiple copies of the step response for the purposes of averaging them and reducing measurement noise, or to sample the response at a frequency slightly below the square wave frequency, thus effectively sampling at a higher frequency. As an example, if the square wave has a frequency of 1 kHz and only the rising edges are considered, then a step response occurs every 1 millisecond. In an embodiment, the apparatus sample at every 1.000000001 milliseconds (1 millisecond+1 nanosecond) to obtain an effective sampling frequency of 1 GHz (one sample of the step response every 1 nanosecond). The same principle can be applied to an embodiment having a DUT/SUT response to an arbitrary input waveform, where the apparatus injects a periodic signal that simply repeats the given arbitrary input waveform indefinitely (for example, consider the 1 kHz example, then: apply given waveform; maintain final voltage until 0.5 milliseconds from the start of the waveform; bring signal voltage to 0 Volts during 0.5 milliseconds; repeat indefinitely).

In accordance with the techniques herein, the low-voltage aspect is intended to avoid damage or inadvertent activation of some of the DUT/SUT's functionality: electronic circuits typically have a threshold in the order of 0.6 or 0.7 Volts, above which the semiconductor junctions are "activated" and can react in ways from having the circuit execute some internal action (possibly with permanent observable outcomes), to suffering damage due to incorrect operation of the circuit. As noted, apparatus (e.g. measurement systems) may be configured to use step signals of any arbitrary voltages (or, as previously indicated, any arbitrary input signals of any arbitrary voltages or other characteristics).

Figure 4:
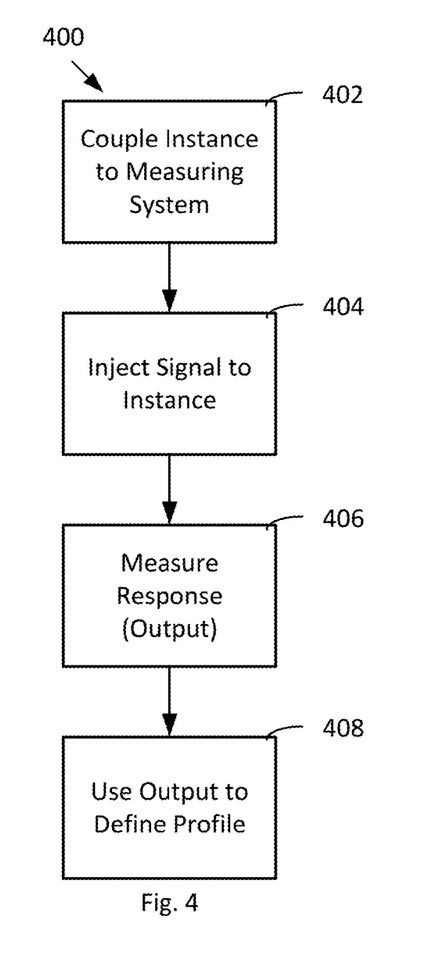
FIG. 4 is a flowchart of operations to define a profile in accordance with an embodiment.
Figure 5:
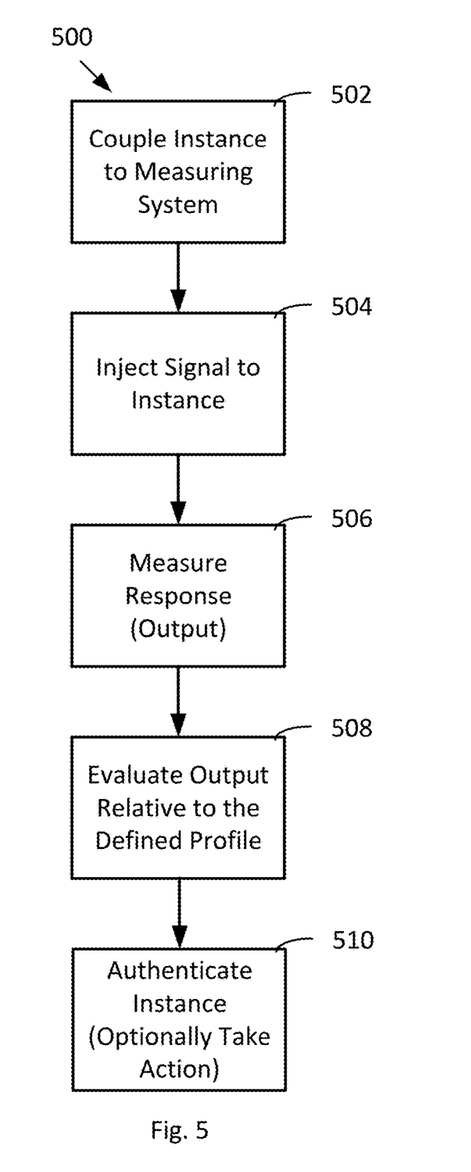
FIG. 5 is a flowchart of operations to authenticate a DUT/SUT relative to a profile in accordance with an embodiment.

In accordance with the techniques herein a system operates as a monitor that enforces correct/normal response to an injected signal (e.g. step input signal) for each of the pins of an electronic IC, each of the terminal connections of an electronic device, or the wire(s) of a local communication network such as the CAN bus in modern automobiles. FIGS. 4 and 5 are respective flowcharts showing respective method operations 400 and 500 in accordance with respective embodiments. Operations 400 relate to profiling a device/system or each class of device/system (e.g., each IC model, or the CAN bus of each vehicle model, or each vehicle in a fleet, etc.). It will be apparent that a legitimate/authentic CAN bus may be profiled without any connected components, e.g. as a "naked" bus, to give a baseline profile for comparison to other naked buses. Such a comparison may detect differences with other buses, which difference may comprise a hidden component in an inauthentic bus, for example. A CAN bus may be profiled with one or more components coupled thereto for example, for each model and/or configuration (e.g. accounting for vehicle options, etc.) that is assembled for operation.

In accordance with the embodiment, at 402, an instance of a DUT/SUT for a device/system to be profiled is coupled to a measuring system configured to inject an input signal and measure an output response (e.g. at each pin or each connection). Such a measurement system may comprise the systems 100A, 100B, 200A, 200B and 300 of FIGS. 1A, 1B, 2A, 2B and 3, by way of example. At 404, a signal is injected. At 406 a response (e.g. an output) is measured. At 408 the output is used to define the profile.

In some embodiments, the DUT/SUT comprises an authentic, unaltered DUT/SUT so as to provide an authentic characterising response (output). In some embodiments, the DUT/SUT comprises a counterfeit or altered DUT/SUT to represent a known inauthentic device/system such as for training a machine learning model (e.g. a classifier) with various ground truths (known good/known bad).

In an embodiment (some or all of) operations 400 are repeated. For example, multiple measurements (either multiple measurements on the same device or over multiple units of the same model of DUT/SUT are obtained, whether known good or known bad as applicable to the type of profile being defined. The multiple measurements (outputs) are used to build a statistical profile, thus reducing the effect of noise or natural deviations from device to device due to manufacturing variations.

It will be appreciated that building a statistical profile is driven, at least in part, by a choice of technique to be used during subsequent operations to compare an instance or unit of a device/system to the profile when authenticating instances thereof. In some embodiments, machine learning (ML) techniques are used to define a classifier such as a support vector machine classifier, k nearest neighbour (k-nn) classifier, or random forest classifier, etc. using features extracted from the step response or features or a subset of values extracted from the frequency response. Accordingly, such output data for known good and known bad units is collected for training the model.

In some embodiments, a set of output values are measured (e.g. at certain frequencies) and used to define a multidimensional vector for an authentic device/system. A similar vector is then defined for an instance of a DUT/SUT to be authenticated and a distance to the profile vector is evaluated.

In an example, a profile is defined from the step response (or the frequency response) to characterize authentic devices/systems and then for a DUT/SUT to be authenticated a dynamic time warping (DTW) distance is evaluated between its step response and the profile known to be authentic, using a threshold on this distance to decide whether the DUT/SUT is authentic/untampered or not.

In accordance with an embodiment a particular profile is defined as instructions and/or data for evaluating the output response by a signal processing system. In accordance with an embodiment a database or other data store stores respective profiles for respective devices/systems such that a signal processing system is configurable to evaluate multiple types of devices/systems. Such types may comprise respective models or configurations of a same type. By way of example, the system may be a CAN bus based system for a vehicle model. One type may be a base model, and other types be other models or optional equipment versions of a same model.

Operations 500 of FIG. 5 relate to authentication operations to evaluate an instance of a DUT/SUT for a device/system that was previously profiled. Operations 502, 504 and 506 are similar to operations 402, 404 and 406. At 508, operations evaluate the output relative to the defined profile. Such evaluation may vary with the type of profile defined as previously described. In some embodiments, the profile is define as a trained classifier and the result is a classification. In some embodiments, a multidimensional vector is defined from the output to compare to the profile. A threshold may be used to define a scope of variance. At 510 the instance is authenticated. In an embodiment the authentication result (e.g. a pass fail or other indication) is provided such as for display. In an embodiment, an action is taken for example to reject or not the instance. Other actions are contemplated. The action itself may be automated. The action may be signaled or triggered by the authentication.

Operations 500 (or variants thereof) are useful in a variety of scenarios. For example, users (e.g., companies, or government or military entities) manufacture or assemble some system(s) that use electronic parts or devices that need to be tested for authenticity. During this phase, the users measure each of the parts (or a random sampling of the parts being used, as is commonly done in quality control protocols) to determine their response to step input signals, and compare these responses against the profiles previously obtained for legitimate parts. Any significant deviation is flagged as a potential counterfeit or tampered part.

The operation phase can also be a "continuous operation", in which the apparatus herein described can be incorporated as part of the SUT, for example as a system under protection so that the measuring system provides on-going (continuous) monitoring. One or more of a systems parts or components may be monitored. In an embodiment, the authentication results may be stored at the SUT (e.g. to a storage device such as a memory or other device) and communicated from the SUT (e.g. by display, by coupling an external reading device to the storage device, or by wire or wireless communication to another device, etc.) This on-going monitoring can be accomplished by periodically (e.g., at power up, or during periods of "idle" operation of the device, etc.) injecting step signals and observing the response. For example, in an embodiment, some of operations 500 (e.g. 504-510) are performed periodically. Operations 510 comprise communicating the authentication result.

Figure 6:
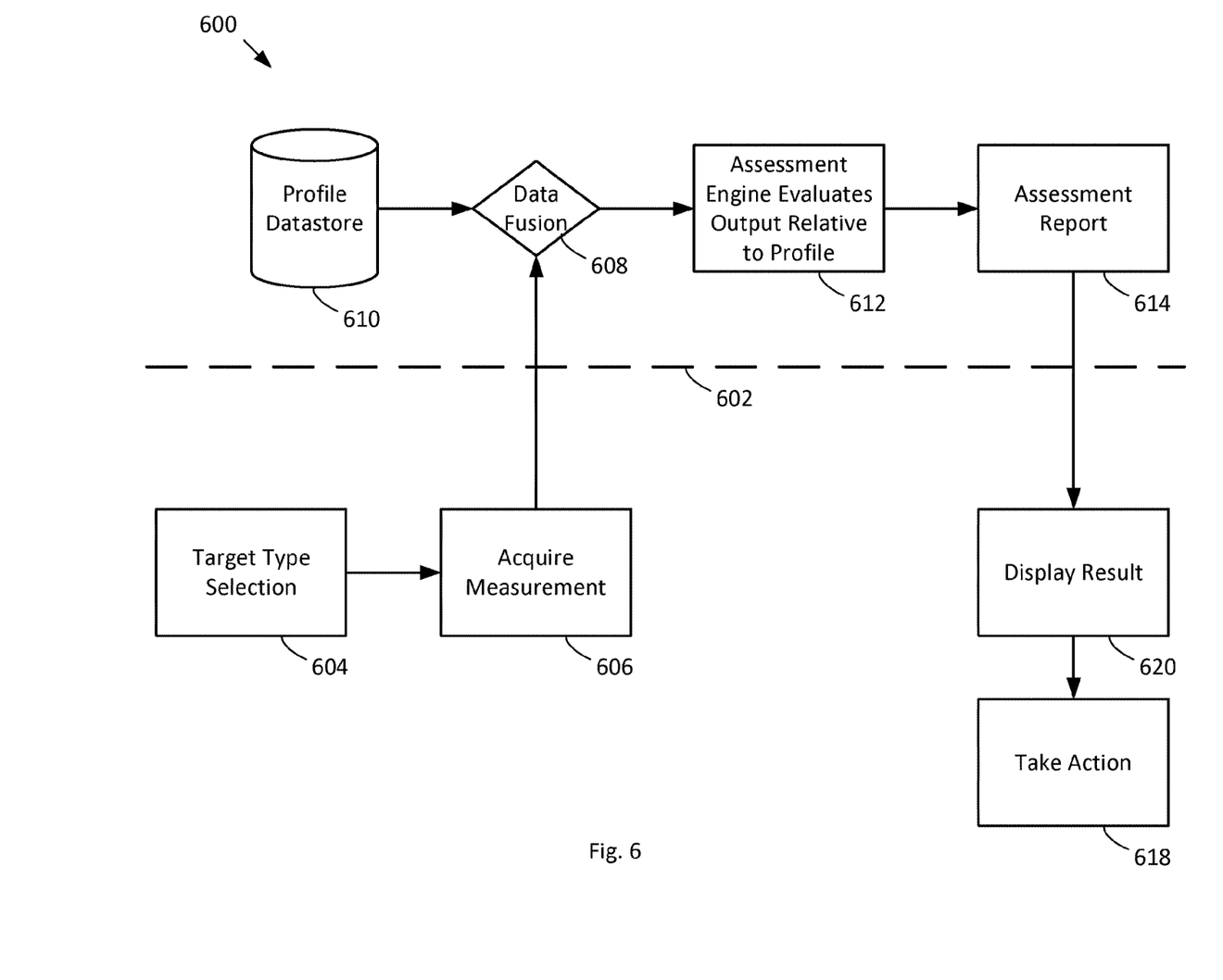
FIG. 6 is a flowchart of operations to authenticate a DUT/SUT relative to a profile in accordance with an embodiment providing a service-based model.

FIG. 6 shows operations 600 for authenticating DUTs/SUTs using a distributed measuring system in accordance with an embodiment. In the embodiment, a signal injecting component (e.g. a pulse generator or pulse/frequency sweep generator component) and signal capturing component are local to the DUT/SUT; however, a signal processing component is remote to the DUT/SUT. Broken line 602 delineates local and remote operations (relative to the location of the DUT/SUT). The output signal is communicated (e.g. from the location of the signal capturing component) to the processing component for remote authentication. In an embodiment, authentication may be provided in a service model, such as in a Software-as-a-Service (SaaS) model, where the signal processing components are located in a cloud environment. In an embodiment, communications between the test location and processing location are secure. At 604 a target type selection is received at a test location of the DUT/SUT. The type identifies the test to be performed and is useful to identify the profile to be used for evaluation. Though not shown specifically, the DUT/SUT is coupled to the applicable signal generator and signal receiver. At 606 an output (response) measurement is generated for the DUT/SUT and communicated to an assessment location remote from the test location in association with the target type.

At 608 data fusion is performed responsive to the target type selection, for example, and profile information (e.g. instructions and/or data) stored to PAS database 610 to determine an applicable profile or use during evaluation operations. At 612, an assessment engine performs evaluation of the output using the applicable profile and the output. An assessment report 614 (e.g. an authentication result) is generated. The result is communicated to the test location such as for display (at 616) and action (618).

In accordance with an embodiments, for ICs or for devices where multiple pins or multiple terminal connections are present, the apparatus applies simultaneous step signals to all the pins, and measure all the responses or, the apparatus iterates through each of the pins or connections, individually applying a step input signal in sequence, and individually measuring the corresponding response. The former may have the advantage that simultaneous joint-response measurements may capture additional characteristics of the device or IC that derive from the interconnections and physical relation between different sub-systems of the device under test. This can in turn make it less likely that a counterfeit part will exhibit similar responses (thus, making the technique more resilient to sophisticated attempts to circumvent the counterfeit detection). The latter has the advantage that the design and implementation of the apparatus is more economical.

In any of the examples, if the system under test or protection has multiple access points, the descriptions in the above items cover the case of injecting a signal or signals at an arbitrary subset of the access points, and measuring the response at an arbitrary subset of the access points, independently of the subset at which the input signals were injected.

If injecting signals at multiple access points, the signals can be either multiple copies of the same signal, or can be independently chosen signals. Similarly, different analysis techniques (e.g., time-domain response vs. frequency-domain characteristics of the system's response) can be used for each of the access points or for different subsets. As an example, in an 8-pin integrated circuit, the apparatus injects a step signal at pins 1 and 2, a ramp or triangular wave at pin 3, and a frequency sweep at pins 4, 5, and 6; then, measures the waveform of the response at pins 1, 2, 7, and 8, and measure the frequency response or any frequency-domain characteristics at all eight pins.

In accordance with embodiments, the techniques are applied to efficiently and effectively separate target DUTs/SUTs (e.g. a set of arbitrary, blackbox electronic targets some of which are authentic and some are counterfeit) into appropriate categories. In an embodiment, the technique is applied to operate: without any required user input; without powering up the target; without affecting the certification of the chip; and without requiring removal of the target from an assembly. Arbitrary in the context means that no assumption is made about the electronic component being evaluated (e.g. viz. the package, manufacturing process, layout, or gate technology used in the target) and includes support for both analog and digital circuits. Blackbox in the context means that the assessment protocol requires no disclosure of proprietary information on the function or use of the electronic target. In accordance with embodiments, no vendor buy-in is needed, for example, to integrate RFID technology for tracking. Target DUTs/SUTs in the context means that the assessment protocol is applicable to discrete microchips, assemblies such as a circuit board, and entire devices.

In accordance with embodiments, the techniques are applied to offers effective protection against the following supply chain related threats:

Alternate (Counterfeit) Design: Counterfeit chips or devices are manufactured and sold by companies seeking profit. Although by itself, this may not represent a security threat, it may constitute a risk to the user: for safety- or mission-critical systems, the reliability of the parts is of particular importance. Deviations are detected from an authentic chip/device internal design (silicon die for chips, and boards, components, and interconnections for devices). Counterfeit designs by their nature exhibit large deviations from the original designs that they target.

Chip/Device Alteration: Malicious alterations can also occur, especially in the case of devices, with a variety of purposes: exfiltrating data, disrupting the functionality of the device (e.g., for ransom or extortion purposes, sabotage, etc.). These alterations can involve addition, removal, or replacement of elements, and cause a deviation from the characteristics of the original device.

Active or Dormant Implant: Alterations may remain dormant to avoid detection. The malicious functionality is typically triggered by some condition such as a given point in time, or some particular operating conditions. In accordance with embodiments, the assessment protocol is invariant of target's behavior and internal state, its effectiveness is unaffected by the type of implant.

Modifications to the device, such as the addition of logic bombs, Trojans and other malicious logic, can be detected even if they are hidden or dormant. In the case of chips, the detection capability can reveal arbitrary silicon-based hardware Trojans (and other modifications) where transistor gates have been surreptitiously added or removed from the die. This includes Trojans that may only be activated by a time delay or other triggers such as heat-based. This capability can also be applied at the board or device level to check whether additional components have been added or removed from a bus or other control lines.

In accordance with embodiments, assessment is non-destructive. A target can be re-assessed indefinitely without issue. Thus, the assessment protocol can be repeated at different stages of the assembly process to guarantee integrity throughout the lifecycle. In accordance with embodiments, the method does not temporarily or permanently damage the target. It does not cause any temporary or permanent changes to the target. Assessment inputs are always within safe target operating and environmental limits. Consequently, targets will be usable for actual deployment after the assessment process without any loss of certification.

In accordance with embodiments, the assessment method does not rely on X-rays, gamma radiation, or any other radioactive or hazardous sources. A test operator can operate apparatus herein in accordance with embodiments without any specialized Personal Protective Equipment (PPE).

In accordance with embodiments, the assessment protocol is in situ and allows the target DUT/SUT to remain integrated into its overall system (e.g., a target chip can remain on the circuit board during the execution of the assessment protocol). The in-situ testing also applies to entire devices.

The in-situ property also applies to the establishment of a profile and does not require any manufacturing changes to the device, the addition or subtraction of circuitry or the changing of die packaging. Access to the exposed die is not required. This minimizes cost and error.

In accordance with embodiments, the target DUT/SUT remains powered off during the assessment. In contrast to other approaches, no sequencing or external interaction is required with the target. Consequently, the assessment method executes without the need of an extensive testing harness to boot up devices.

In accordance with embodiments, assessment time is short, less than two seconds providing fast cycle-time scalability. Depending on the complexity of the target, the assessment protocol can be shortened, further reducing cycle times, allowing use in-line with an assembly line setup.

In accordance with embodiments, granular profiles are constructed to distinguish devices/systems by lot code, (e.g. given sufficient samples). A particular model IC is distinguishable by lot code, revision code or other identifying information.

In accordance with embodiments, the methodology and apparatus are robust against environment influences, performing similarly on different dates with different ambient temperatures.

A defective target will behave differently during the analysis. In accordance with embodiments, the techniques may be further used to distinguish defective targets such as for removal from an assembly/integration process.

In accordance with embodiments, the techniques, etc. are useful to de-risk procurement of electronics from out-of-region sources and is superior to alternatives based on technology such as X-ray, RFID, power profiles, and visual inspection. Applications may include but are not limited to:

Identifying counterfeit or tampered parts: In accordance with embodiments, the techniques etc. are useful to reduce recalls and warranty claims, and at the same time, increase security. Parts that fail the assessment protocol should not be used in mission critical operations (or actually, any electronics).

Enforcing lot codes: In accordance with embodiments, the techniques etc. are useful to detect vendors selling lot codes previously associated with other vendors, enabling manufacturers to define whitelists for lot codes and to enforce these whitelists.

Identifying reclaimed, recycled, or prototype chips: In accordance with embodiments, the techniques etc. are useful to detect devices that are outliers on specified lot codes. Outliers can indicate reclaimed, recycled, or prototype targets.

Reverse engineering of targets: In accordance with embodiments, the techniques, etc. are useful to reverse-engineer targets and provide suggested bills-of-materials lists down to lot code numbers.

To demonstrate the capabilities provided by the techniques described and shown herein, the FT232RL USB-to-TTY Serial UART microchip from Future Technology Devices International (FTDI) was evaluated as a target. This target is widely known to have replacements sold through different vendors, and consequently, the test represents a real problem existing today. Furthermore, it is possible to establish the ground truth for the tests by using FTDI's own assessment tool to verify the authenticity or each chip instance.

The goal of the quantitative evaluation was to answer two questions:

1. Given a set of positively authenticated FT232RL targets, can a method/apparatus according to an embodiment herein correctly label previously un-seen authentic and non-authentic microchips?

2. Given authentic FT232RL targets, can the method/apparatus differentiate between different manufacturing runs, i.e., determine the lot code version?

The quantitative evaluation used 130 FT232RL microchips purchased from different vendors: 50 from FTDI authorized distributors (Auth_Vendor 1 and Auth_Vendor 2), and 80 from auction-based websites (Auction_Vendor 1 and Auction_Vendor 2). Table 1 shows the used quantities per vendor.

TABLE 2

The Quantities of Chips per Vendor

| Vendor | Quantity |
|---|---|
| Auth_Vendor 1 | 10 |
| Auth_Vendor 2 | 40 |
| Auction_Vendor 1 | 40 |
| Auction_Vendor 2 | 40 |

Each FT232RL was assigned a numerical ID to enable tracking. The assessment protocol also included acquiring the manufacturing lot code, date code, revision code and other identifying information.

To demonstrate that the method and apparatus is robust against environment influences, the assessment protocol was executed on different dates and with varying target ambient temperatures.

A ground truth was established through FTDI's published procedures and independently through extensive chip X-rays. The test set was always kept separate from the training set.

From the whole test series, the method and apparatus authenticated 126 previously unseen chips comprising 72 authentic chips and 103 (unauthorized) replacements with zero false positives or false negatives.

Further evaluation was conducted through 100 repeated trials varying the training and test sets. In each trial, a subset of 4 authentic chips where used as the training set. A similarity score (distance metric) was defined between the profile defined for the training set and the instances of the test set. Marked similarity was shown between authentic chips and the profile whereas marked and distinct dissimilarities were exhibited by respective chips from each of the two unauthorized vendors, demonstrating how well the method and apparatus can discern authentic chips from unauthorized chips.

Furthermore, the method and apparatus positively identified that there are at least two and approximately three types of unauthorized chips available on the market.

An outlier result for one chip also demonstrated non-functioning chip detection—which malfunctioning may not exhibit functional loss under X-ray.

The evaluation showed that the method and apparatus can identify the lot code of all authentic (48) previously unseen targets with 100% accuracy from a baseline of only two (2) positively authenticated samples. The authentic samples contained two different lot codes. Since lot code numbers on unauthorized devices are largely meaningless and cannot be trusted, only lot codes from authentic devices were considered. The method and apparatus had perfect recall when identifying which chips belong to a specific lot code. The experiment was repeated 100 times.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What is claimed is:

1. A method comprising:

receiving test output generated for a device under test (DUT)/system under test (SUT), the test output generated in response to an injected signal applied to authenticate the DUT/SUT to elicit one or more response signals, the test output determined from one or more measurements of at least one response signal comprising a transmission signal and/or a reflection signal, the one or more measurements using time-domain reflectometry (TDR) or TDR-like techniques, and the DUT/SUT treated as a network of transmission lines for the one or more measurements;

evaluating by comparing the test output with a statistical profile defined for authenticating the DUT/SUT to determine an authentication result, or processing the test output with a trained model for authenticating the DUT/SUT to determine the authentication result for the DUT/SUT, wherein the statistical profile or the trained model is defined, using statistics and/or machine learning techniques, from multiple measurements of one or more instances of a same type of device/system as the DUT/SUT and wherein the one or more instances comprise known authentic or known inauthentic instances applicable to define the statistical profile or trained model, and wherein the multiple measurements reduce an effect of measurement or natural deviations in device/system manufacturing between two or more of such instances; and providing the authentication result for at least one of display or subsequent action relative to the DUT/SUT.

2. The method of claim 1, wherein the injected signal is injected into the DUT/SUT in a powered off state and remains powered off to authenticate the DUT/SUT.

3. The method of claim 1, wherein the authentication result is provided for the subsequent action and wherein the subsequent action comprises rejecting or accepting the DUT/SUT or identifying a DUT/SUT as a counterfeit part or tampered part responsive to the authentication result.

4. The method of claim 1, wherein the evaluating comprises using a dynamic time warping (DTW) algorithm to analyse a DTW distance between the response of the DUT/SUT and the statistical profile defined from one or more instances known to be authentic; and applying a threshold to the DTW distance as computed to authenticate the DUT/SUT.

5. The method of claim 1, wherein the evaluating includes a frequency-domain evaluation or a time-domain evaluation.

6. The method of claim 5, wherein the injected signal comprises a frequency sweep or a plurality of signals at discrete frequencies.

7. The method of claim 1, wherein the evaluating includes a power spectrum evaluation.

8. The method of claim 7, wherein one of:

the injected signal comprises a white noise or random signal having a known power spectrum a priori; or the injected signal comprises a random signal having an unknown power spectrum a priori and the method comprises measuring the power spectral density (PSD) of the random signal and the at least one response signal to determine a frequency response.

9. The method of claim 1, wherein the injected signal comprises a signal to remain under a voltage threshold that activates a functionality of the DUT/SUT.

10. The method of claim 9, wherein evaluating includes any of a time-domain evaluation and a frequency-domain evaluation combined with any patterns in an amplitude and/or power of the injected signal.

11. The method of claim 1, wherein the method is performed as a cloud-based service, the receiving comprising receiving, at a cloud-based authentication system, a transmission of the output generated at a remotely located test location.

12. The method of claim 1, wherein:
the injected signal comprises a simultaneous signal injected to all pins, terminal connections or wires of the DUT/SUT at the same time and the one or more measurements are also obtained from all the pins, terminal connections or wires; or
the injected signal comprises a plurality of step signals injected one by one in a sequence to each of all the pins, terminal connections or wires of the DUT/SUT and the one or more measurements are also obtained from all the pins, terminal connections or wires.

13. The method of claim 1, wherein the DUT/SUT comprises a plurality of pins, terminal connections or wires and the one or more measurements are from a first arbitrary subset of the plurality and wherein the injected signal is injected at a second arbitrary subset of the plurality, the second subset being independent of the first subset to obtain an arbitrary measurement set that treats the DUT/SUT like a network of transmission lines.

14. The method of claim 1, wherein the injected signal comprises one of:
multiple copies of a same signal applied to the DUT/SUT; or
different signals applied to the DUT/SUT.

15. The method of claim 1, wherein the injected signal comprises different signals applied to the DUT/SUT, some of which different signals are configured to generate output for time-domain evaluation and some of which different signals are configured to generate output for frequency-domain evaluation.

16. The method of claim 1, wherein the DUT/SUT comprises any of: a vehicle network having a CAN bus; a PCB; or a collection of interconnected electronic devices.

17. The method of claim 1, wherein the authentication result authenticates an electronic component of the DUT/SUT or wherein the authentication result indicates an electronic component is added to or removed from the DUT/SUT.

18. The method of claim 1, wherein the injected signal is superposed to signals of the DUT/SUT in operation without affecting the operation.

19. The method of claim 1 comprising:
receiving a target type selection for the DUT/SUT to identify the statistical profile or trained model to be used for determining the authentication result;
performing data fusion responsive to the target type selection and information stored to a database to determine the statistical profile or trained model; and performing the evaluating of the test output using the statistical profile or trained model.

20. A system comprising:
authentication circuitry to evaluate test output generated for a device under test (DUT) or system under test (SUT), the test output generated in response to an injected signal applied to authenticate an electronic component of the DUT/SUT to elicit one or more response signals, the test output determined from one or more measurements of at least one response signal comprising a transmission signal and/or a reflection signal, the one or more measurements using time-domain reflectometry (TDR) or TDR-like techniques, and the DUT/SUT treated as a network of transmission lines for the one or more measurements, wherein the authentication circuitry evaluating the test output relative to a statistical profile for the DUT/SUT to generate an authentication result or processing the test output with a trained model for authenticating the DUT/SUT to determine the authentication result;
wherein the statistical profile or the trained model is defined, using statistics and/or machine learning techniques, from multiple measurements of one or more instances of a same type of device/system as the DUT/SUT and wherein the one or more instances comprise known authentic or known inauthentic instances applicable to define the statistical profile, and wherein the multiple measurements reduce an effect of measurement or natural deviations in device/system manufacturing between two or more of such instances.

21. The system of claim 20 comprising a data store storing respective statistical profiles and/or trained models for different types of DUTs/SUTs, and wherein the system comprises circuitry configured to determine the statistical profile or the trained model for the authentication circuitry from the respective statistical profiles and/or trained models.

22. The system of claim 20, wherein the DUT/SUT comprises a plurality of pins, terminal connections or wires and the one or more measurements are from a first arbitrary subset of the plurality and wherein the injected signal is injected at a second arbitrary subset of the plurality, the second subset being independent of the first subset to obtain an arbitrary measurement set that treats the DUT/SUT like a network of transmission lines.

23. The system of claim 20 configured as a cloud-based service.

24. The system of claim 20, wherein one of: i) the injected signal comprises a white noise or random signal having a known power spectrum a priori; or ii) the injected signal comprises a random signal having an unknown power spectrum a priori and the authentication circuitry is configured to measure the power spectral density (PSD) of the injected signal and the at least one response signal to determine a frequency response.

25. The system of claim 20, wherein:
the injected signal comprises a simultaneous signal injected to all pins, terminal connections or wires of the DUT/SUT at the same time and the one or more measurements are also obtained from all the pins, terminal connections or wires; or
the injected signal comprises a plurality of step signals injected one by one in a sequence to each of all the pins, terminal connections or wires of the DUT/SUT and the one or more measurements are also obtained from all the pins, terminal connections or wires.

26. A computer program product comprising a non-transient storage device storing instructions, which when executed by at least one processor, cause the at least one processor to:

receive test output generated for a device under test (DUT)/system under test (SUT), the test output generated in response to an injected signal applied to authenticate the DUT/SUT to elicit one or more response signals, the test output determined from one or more measurements of at least one response signal comprising a transmission signal and/or a reflection signal, the one or more measurements using time-domain reflectometry (TDR) or TDR-like techniques, and the DUT/SUT treated as a network of transmission lines for the one or more measurements;

compare the test output to a statistical profile defined for authenticating the DUT/SUT to determine an authentication result, or process the test output with a trained model for authenticating the DUT/SUT to determine the authentication result, wherein the statistical profile or the trained model is defined, using statistics and/or machine learning techniques, from multiple measurements of one or more instances of a same type of device/system as the DUT/SUT and wherein the one or more instances comprise known authentic or known inauthentic instances applicable to define the statistical profile or trained model, and wherein the multiple measurements reduce an effect of measurement or natural deviations in device/system manufacturing between two or more of such instances; and provide the authentication result for at least one of display or subsequent action relative to the DUT/SUT.

27. The computer program product of claim 26, wherein:
the injected signal comprises a white noise or random signal having a known power spectrum a priori; or
the injected signal comprises a random signal having an unknown power spectrum a priori and the method comprises measuring the power spectral density (PSD) of the injected signal and the at least one response signas to determine a frequency response.

28. The computer program product of claim 26, wherein:
the injected signal comprises a signal to remain under a voltage threshold that activates a functionality of the DUT/SUT.

29. The computer program product of claim 26, wherein the DUT/SUT comprises a plurality of pins, terminal connections or wires and the one or more measurements are from a first arbitrary subset of the plurality and wherein the injected signal is injected at a second arbitrary subset of the plurality, the second subset being independent of the first subset to obtain an arbitrary measurement set that treats the DUT/SUT like a network of transmission lines.

* * * * *